US007014673B2

(12) United States Patent
Mullins (10) Patent No.: US 7,014,673 B2
(45) Date of Patent: Mar. 21, 2006

(54) FILTERING APPARATUS (75) Inventor: Philip Arthur Mullins, Manvers (GB)

(73) Assignee: BTU International, Inc., N. Billerica, MA (US)

( * ) Notice: Subject to any disclaimer, the term of this patent is extended or adjusted under 35 U.S.C. 154(b) by 0 days.

(21) Appl. No.: 10/971,660

(22) Filed: Oct. 22, 2004

(65) Prior Publication Data
US 2005/0050866 A1 Mar. 10, 2005

Related U.S. Application Data (63) Continuation of application No. 10/454,229, filed on Jun. 4, 2003, now Pat. No. 6,808,554, which is a continuation of application No. 09/907,103, filed on Jul. 17, 2001, now Pat. No. 6,576,030.

(30) Foreign Application Priority Data

May 30, 2001 (GB) ................................. 01 13 043

(51) Int. Cl.
B01D 46/00 (2006.01)
(52) U.S. Cl. .................... 55/385.1; 96/422; 96/377; 96/420; 96/421; 219/201; 219/388; 219/522; 219/526; 228/19; 228/42
(58) Field of Classification Search ............... 55/385.1; 96/422, 377, 420, 421; 219/201, 388, 522, 219/526; 228/19, 42
See application file for complete search history.

(56) References Cited

U.S. PATENT DOCUMENTS

| 4,348,174 | A | | 9/1982 | Spigarelli |
| 4,971,026 | A | | 11/1990 | Fineblum |
| 5,481,087 | A | | 1/1996 | Willemen |
| 5,579,981 | A | | 12/1996 | Matsumura et al. |
| 5,611,476 | A | | 3/1997 | Soderlund et al. |
| 5,641,341 | A | | 6/1997 | Heller et al. |
| 5,855,646 | A | | 1/1999 | Verini |
| 5,911,486 | A | | 6/1999 | Doe et al. |
| 5,993,500 | A | | 11/1999 | Bailey et al. |
| 6,120,585 | A | | 9/2000 | Inomata et al. |
| 6,146,448 | A | | 11/2000 | Shaw et al. |
| 6,576,030 | B1 | * | 6/2003 | Mullins ..................... 55/385.1 |
| 6,808,554 | B1 | * | 10/2004 | Mullins ....................... 96/377 |

FOREIGN PATENT DOCUMENTS

| EP | 0 999 007 A1 | 10/2000 |
| JP | 10022305 A | 1/1998 |
| JP | 10057089 A | 3/1998 |
| WO | WO 99/20425 | 4/1999 |

* cited by examiner

Primary Examiner—Minh-Chau T. Pham
(74) Attorney, Agent, or Firm—Weingarten, Schurgin, Gagnebin & Lebovici LLP (57) ABSTRACT A filtering apparatus for a reflow oven includes a contaminated-gas inlet for receiving contaminated gas from a reflow oven; a filtering device configured to filter the received contaminated gas; a returned gas outlet for returning filtered gas to the reflow oven; a gas removal arrangement for allowing gas to escape from the apparatus; and a control arrangement for controlling the rate of gas flow through the gas removal arrangement such that in use the flow rate of contaminated gas flowing from a hotter region of the reflow oven to a cooler region of the reflow oven is controlled.

26 Claims, 9 Drawing Sheets

FILTERING APPARATUS

CROSS REFERENCE TO RELATED APPLICATIONS

This application claims the benefit under 35 U.S.C. § 119(a)–(d) of British application serial no. GB 0113043.4 filed May 30, 2001, and under 35 U.S.C. § 120 is a continuation of prior U.S. application Ser. No. 09/907,103, filed Jul. 17, 2001, now U.S. Pat. No. 6,576,030 issued Jun. 10, 2003 and is a continuation of U.S. application Ser. No. 10/454,229 filed Jun. 4, 2003, now U.S. Pat. No. 6,808,554, the disclosures of which are incorporated by reference herein.

BACKGROUND OF THE INVENTION

1. Field of the Invention

The present invention relates to filtering apparatus for a reflow oven and a system for reflow soldering.

2. Description of the Related Art

Reflow soldering is now an established method of soldering electronic components to printed circuit boards. The printed circuit boards are produced using a screen printing process in which solder paste containing solder, flux, adhesives and binders is applied to a board in a required configuration. Components are then glued to the printed circuit board at appropriate locations by a pick and place machine. The components may be applied to just one side of the board or, in other cases, both sides.

The reflow soldering process typically takes place by passing a printed circuit board, with its components attached, along the conveyor belt through the tube (or tunnel) of a reflow oven. Within the oven, the board passes through a high temperature region, typically in excess of 200 degrees centigrade, in which the solder melts and forms a joint between the circuit of the board and the respective components. Flux within the paste reacts with metallic surfaces to remove oxide and enhance wetting. The soldering process takes place at a high temperature, but if the temperature is too high damage is caused to, at least, the more sensitive electronic components. Thus, the temperature must be carefully controlled within pre-defined limits, the limits themselves depending on the particular components, solder paste, etc. that are being used.

After the solder joints are formed, the conveyor passes the board through a cooling region of the oven, in which the solder solidifies, before it emerges from the oven.

The oven typically contains a process gas atmosphere of nitrogen, so that oxidation of the board and components is minimized during heating. Consequently, fresh nitrogen is continually input into the oven at considerable expense.

Heat within the oven vaporizes unreacted flux, binders and adhesives contained within the solder paste, while other vapors are liberated by the reaction of the flux on the oxidized contacts of components. Thus, the nitrogen atmosphere becomes contaminated by the aforesaid vapors.

If the contaminated nitrogen migrates into the cooling region or cooler regions of the oven, at least some of the vapors will condense on the cooler surfaces and may drip onto the circuit boards, thus producing defects. Consequently, it is known to have filtering apparatus which extracts contaminated process gas from the oven, filters it to remove most of the flux vapors, and re-inputs the filtered gas into the oven. However, contaminated gas is replaced by filtered gas, new cool nitrogen is continually input to the oven, and the new cool nitrogen expands on heating; therefore the net result is that contaminated process gas tends to be pushed out from the ends of the oven's tunnel. Since the contaminated gas must pass through cooler regions of the oven on its way to the ends of the tunnel, the aforementioned condensation occurs.

In addition, in known systems, the contaminated gas escaping from the ends of the tunnel is sucked away to be expelled to the open air, possibly via a filtration unit. The expelled gas is typically passed through ducting out into the air above the roof of the working area. Such a system has several disadvantages as a consequence. Firstly, since the ducting exhausts the gas above the roof, the variability of wind speed can cause variations in the oven's operation, in particular, its working temperatures. Secondly, if for any reason the oven is required to be relocated, the cost of such is increased due to the need to provide ducting through the roof. Thirdly, providing suction at the ends of the oven's tunnel tends to increase the flow of contaminated gas along the tunnel and enhance the previously discussed condensation problem.

BRIEF SUMMARY OF THE INVENTION

According to a first aspect of the present invention, there is provided a filtering apparatus for a reflow oven, said apparatus comprising: a contaminated-gas inlet for receiving contaminated gas from a reflow oven; filtering means configured to filter said received contaminated gas; a returned gas outlet for returning filtered gas to said reflow oven; a gas removal means for allowing gas to escape from said apparatus; and a control means for controlling the rate of gas flow through said gas removal means such that in use the flow rate of contaminated gas flowing from a hotter region of said reflow oven to a cooler region of said reflow oven is controlled.

According to a second aspect of the present invention, there is provided a system for reflow soldering comprising: a reflow oven; filtering means configured to filter contaminated gas received from said reflow oven; a means for returning filtered gas to said reflow oven; a gas removal means for allowing gas to escape from said system; and a control means for controlling the rate of gas flow through said gas removal means such that in use the flow rate of contaminated gas flowing from a hotter region of said reflow oven to a cooler region of said reflow oven is controlled.

BEST MODE FOR CARRYING OUT THE INVENTION

Figure 1:
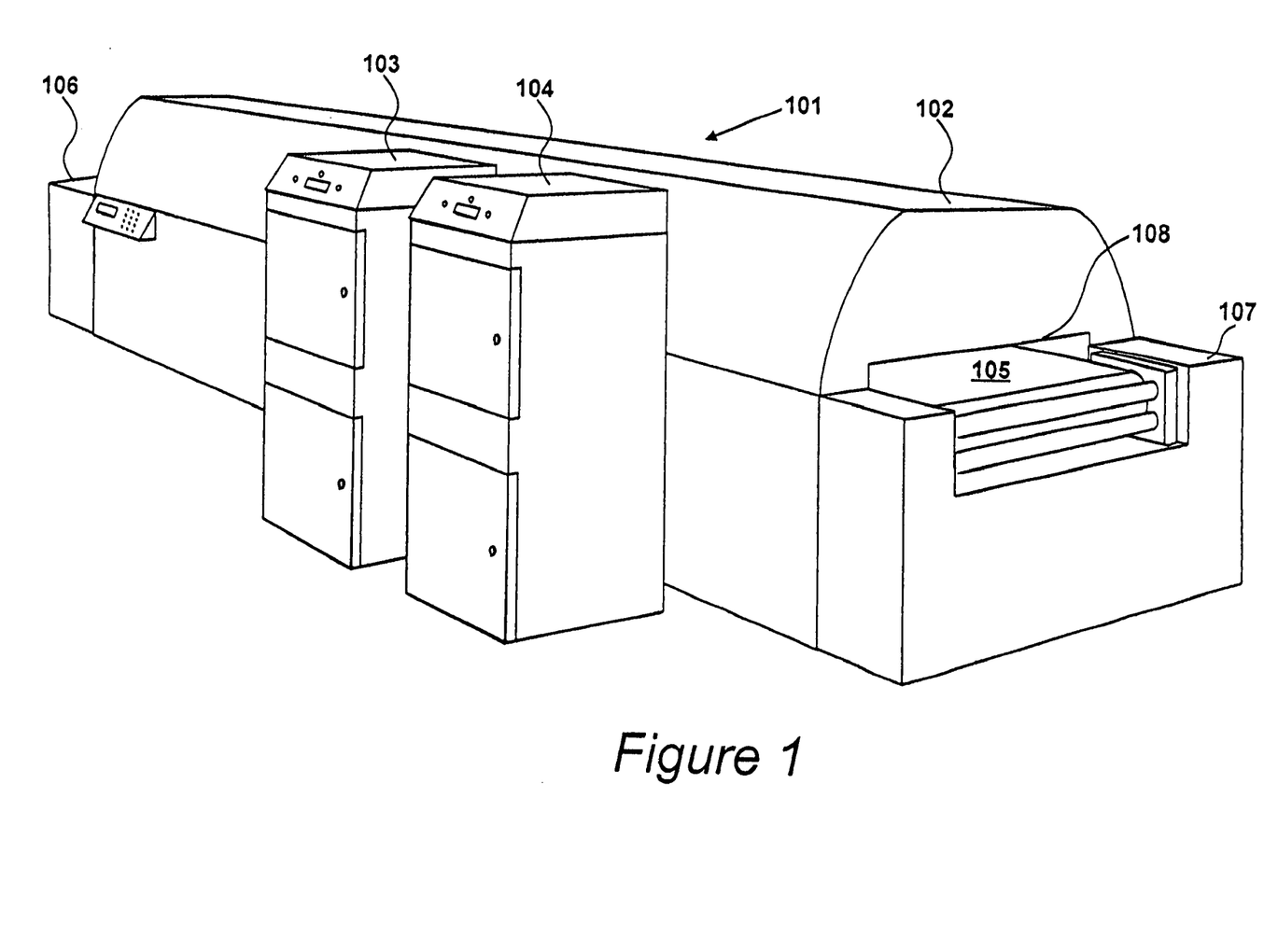
FIG. 1 shows a reflow soldering system 101.

FIG. 1

A reflow soldering system 101 is shown in FIG. 1. The system 101 comprises a reflow soldering oven 102, and filtering units 103 and 104.

Prior to reflow processing, printed circuit boards are produced by a screen printing process, in which solder paste is applied to a board, and then electronic components are attached by a pick and place process. The printed circuit boards with attached components are then applied to a conveyor belt 105 at a first end 106, referred to as the on load end, of the reflow oven 102.

The conveyor belt 105 has a first exposed portion at the on load end 106 and a second exposed portion at the opposite end 107 of the oven, referred to as the off load end. Between the two exposed portions, the belt is enclosed by a tube, referred to as a tunnel within the oven. The oven is configured such that it can maintain a particular temperature profile along the tunnel. Thus, an unsoldered printed circuit board applied to the belt 105 at the on load end 106, is transported through hot and cooler regions of the oven's tunnel and emerges with soldered joints via an opening 108 at the off load end. In addition, the oven is supplied with nitrogen, such that during use the tunnel contains a nominal atmosphere of nitrogen. By providing a non-oxidizing process gas atmosphere, in the form of nitrogen, the board and its components are saved from oxidation during the heating process.

During the passage of printed circuit boards through the tunnel, the board out-gases, flux within the solder paste reacts with the metallic contacts of the electronic components to produce vapors, other unreacted portions of the flux evaporate and other constituents of the solder paste also evaporate.

The first filtering unit 103 is primarily concerned with maintaining the flux vapor levels within the oven below tolerable limits, while the second filtering unit 104 manages the rate of gas exhausted from the system and cleans said gas such that it can be safely exhausted within the workspace of the oven which is occupied by human operators. Furthermore, the filtering unit is configured to cool the exhausted gas, so that it does not heat the surrounding air to intolerably high temperatures for the human operators. Although the function of the two filtering units can be clearly distinguished in such a way, it should be understood that the two units interact to maintain the efficient operation of the system, as will be described later.

Figure 2:
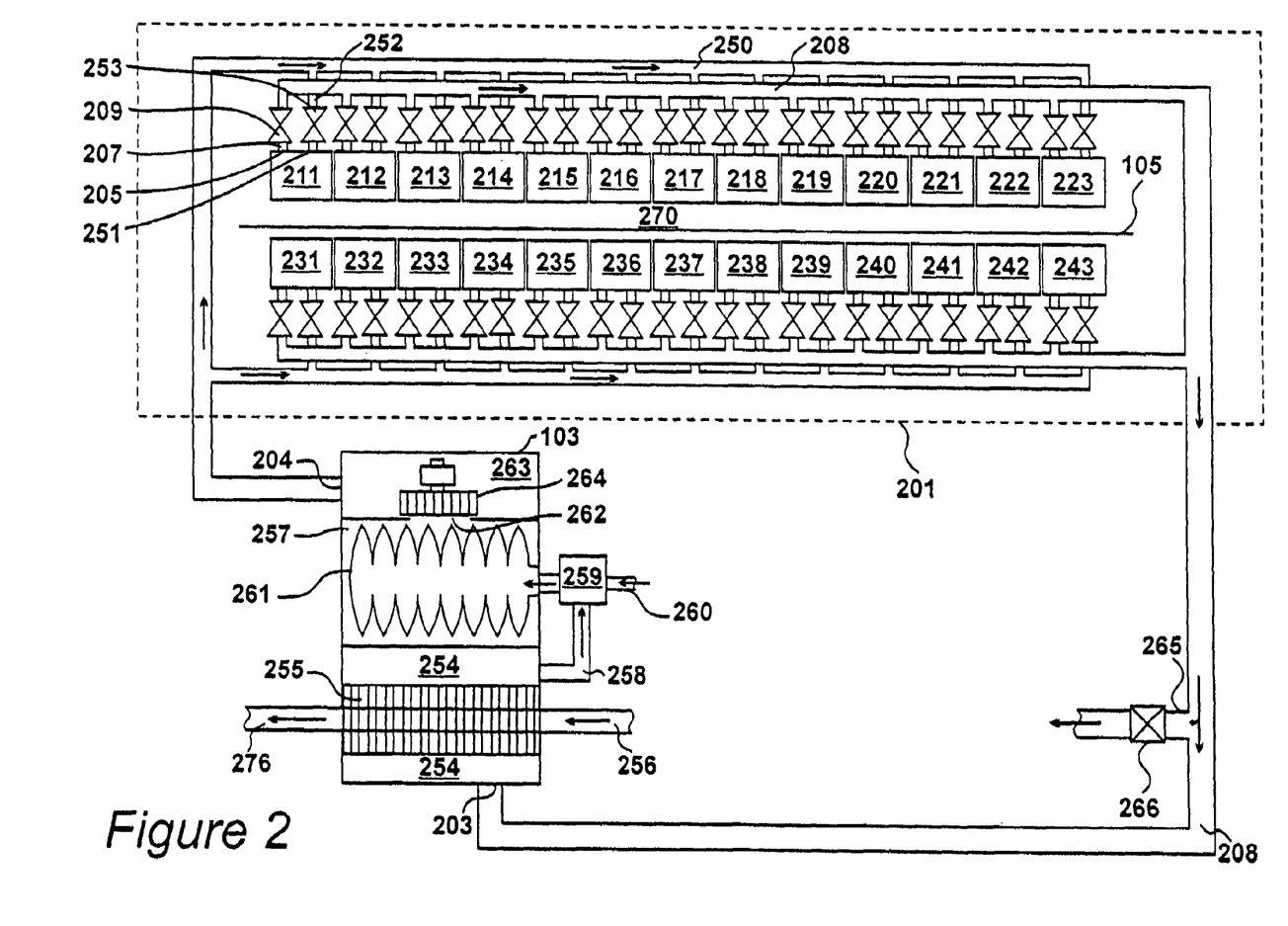
FIG. 2 shows schematically components within the reflow oven 102, along with the filtering unit 103.

FIG. 2

Components within the reflow oven 102 are shown schematically within dashed line 201 in FIG. 2, along with the filtering unit 103. The upper surface of the tunnel 270 is defined by heating units 211 to 223 positioned above it and the lower surface of the tunnel is defined by heating units 231 to 243 positioned below. The heating units are arranged in pairs with one unit of a pair positioned directly above the other, such that any part of the tunnel is heated by one pair of heating units, e.g. units 211 and 231. The portion of the conveyor belt 105 within the tunnel moves from left to right as viewed in FIG. 2, and so it is able to transport printed circuit boards through the pairs of units, from units 211 and 231 to the final pair of units 223 and 243.

Each heating unit has a gas outlet connected by its outlet branch pipe and a main pipe 208 to an inlet 203 of filtering unit 103. The corresponding branch pipe of each heating unit includes a solenoid activated valve which prevents gas flow when closed. For example, heating unit 211 has an outlet 205 connected by branch pipe 207 and main pipe 208 to inlet 203, and the branch pipe 207 includes a solenoid activated valve 209. In a similar manner, each heating unit has a gas inlet connected by an inlet branch pipe and a main pipe 250 to an outlet 204 of filtering unit 103. The corresponding inlet branch pipe of each heating unit includes a solenoid activated valve which prevents gas flow when closed. For example, heating unit 211 has an inlet 251 connected by inlet branch pipe 252 and main pipe 250 to outlet 204, and the inlet branch pipe 252 includes a solenoid activated valve 253.

The inlet 203 connects main pipe 208 to a first chamber 254 of filtering unit 103. Chamber 254 contains a heat exchanger 255 cooled by chilled gas received via pipe 256 and returned via pipe 276. As will be described later, the chilled gas is generated by the second filtering unit 104. The first chamber 254 is connected to a second chamber 257 of unit 103 via a pipe 258 having an in-line Coanda gas mixer 259. The gas mixer 259 also receives fresh nitrogen gas from a liquid nitrogen cylinder via a pipe 260. The pipe 258 is connected to the inlet of a filter-bag 261 located within second chamber 257.

The filter-bag 261 comprises eight connected envelopes of filtering material defining a corresponding eight connected compartments. Due to this configuration, the filter-bag has a large surface area providing filtering.

The second chamber 257 has an outlet 262 connecting it to a third chamber 263. Chamber 263 contains a centrifugal fan 264 located adjacent to the outlet 262 such that in operation it is able to draw air in through outlet 262. The outlet 204 of unit 103 connects the third chamber 263 with main pipe 250.

Branching from main pipe 208 is a gas removal pipe 265 which has an inline balancing valve 266. The valve 266 is configured to be adjustable to allow a variable rate of gas flow from main pipe 208, and in operation it is adjusted in response to tunnel gas flow rate measurements, as described later. The gas removal pipe 265 connects to the inlet of the second filtering unit 104, and this will also be further described later.

In operation each pair of heating units supplies heat to the tunnel, such that a corresponding region of the tunnel is maintained at a specified temperature. By this means, in a typical reflow process, the boards pass through several regions of increasing temperatures up to a particular high temperature (typically between 200 and 300 degrees centigrade depending on the solder paste being used). They then pass through several regions all held at that particular high temperature while the solder joints are formed. The boards then pass through several regions having successively lower temperatures and are therefore cooled before exiting the tunnel. Therefore, typically the temperature of the tunnel between units 211 and 231 is relatively cool, while the region of the tunnel corresponding to units 212, 213, 214 is successively hotter. A region of the tunnel corresponding to a number of units, e.g. units 217, 218, 219 and 220, is at a particular high temperature, providing the "soak area" in which the solder wets the components and forms the joints. The regions corresponding to the following remaining units, e.g. units 221, 222 and 223, are then successively cooler. As a result, the temperature of the tunnel at its ends is low compared to an intermediate region.

During the reflow process, as a printed circuit board passes along the tunnel, from region to relatively hotter region, its temperature gradually increases. As a consequence, the various constituents of the flux are evaporated depending upon their respective vapor pressures at the temperatures concerned. In addition, other vapors are produced as the flux reacts with the contacts of the components of the board. The nitrogen atmosphere within the tunnel thus becomes contaminated by flux vapors.

In order to manage the levels of flux vapors within the tunnel, contaminated gas is extracted from particular ones of the heating units via pipe 208, filtered by unit 103 and the filtered gas is returned to the same particular units via pipe 250. The choice of which units have their gas extracted is determined from a knowledge of the temperatures of each of the units and the volatilization rates of the constituents of the flux. The necessary information regarding volatilization rates is made available by solder paste manufacturers as a TGA diagram. Specifically, the units which have temperatures corresponding to high volatilization rates are identified as those requiring extraction and the corresponding solenoid valves are therefore opened.

In addition, when the contaminated gas is extracted from particularly hot heating units, solenoid valves corresponding to one or more of the cooler heating units in the warm up sequence, such as units 211, 231, are opened so that the gas arriving at the filtering unit is already cooled to some degree. Thus a first stage of cooling is provided even before the hot contaminated gas arrives at the filtering unit 103.

In operation, nitrogen gas contaminated with flux vapors is drawn from the selected heating units and the larger part of this enters filtering unit 103, where it is cooled by heat exchanger 255. The cooled contaminated gas is then mixed with fresh nitrogen gas within the Coanda gas mixer 259. Since the fresh nitrogen gas is relatively cool, being at or below ambient temperature, it cools the contaminated gas further before the mixture of gases enters the filter bag 261. The three stages of cooling are each adjustable to ensure that the final temperature of the mixed gases is sufficiently low to cause the flux vapors to condense and also maintain the filter bag temperature at required levels. Furthermore, by controlling the temperature in this way, conventional filtering media, such as non-woven polyester, may be used in the construction of the filter-bag.

It should also be noted that by using nitrogen in the filtering unit 103 to assist cooling of contaminated gas, at the same time, the contaminated gas is used to heat up the fresh nitrogen. Thus energy may be saved in comparison to existing systems, in which fresh nitrogen is piped directly into the oven.

The filtered gas which escapes from the filter-bag is then drawn into chamber 263 by the centrifugal fan 264. The increased pressure in chamber 263 forces the filtered gas back to the heating unit via pipe 250. It should be noted that the movement of gas to and from the filter unit 103 is primarily caused by the centrifugal fan 264, but is also assisted by fans located in the heating units such as 211.

Figure 3:
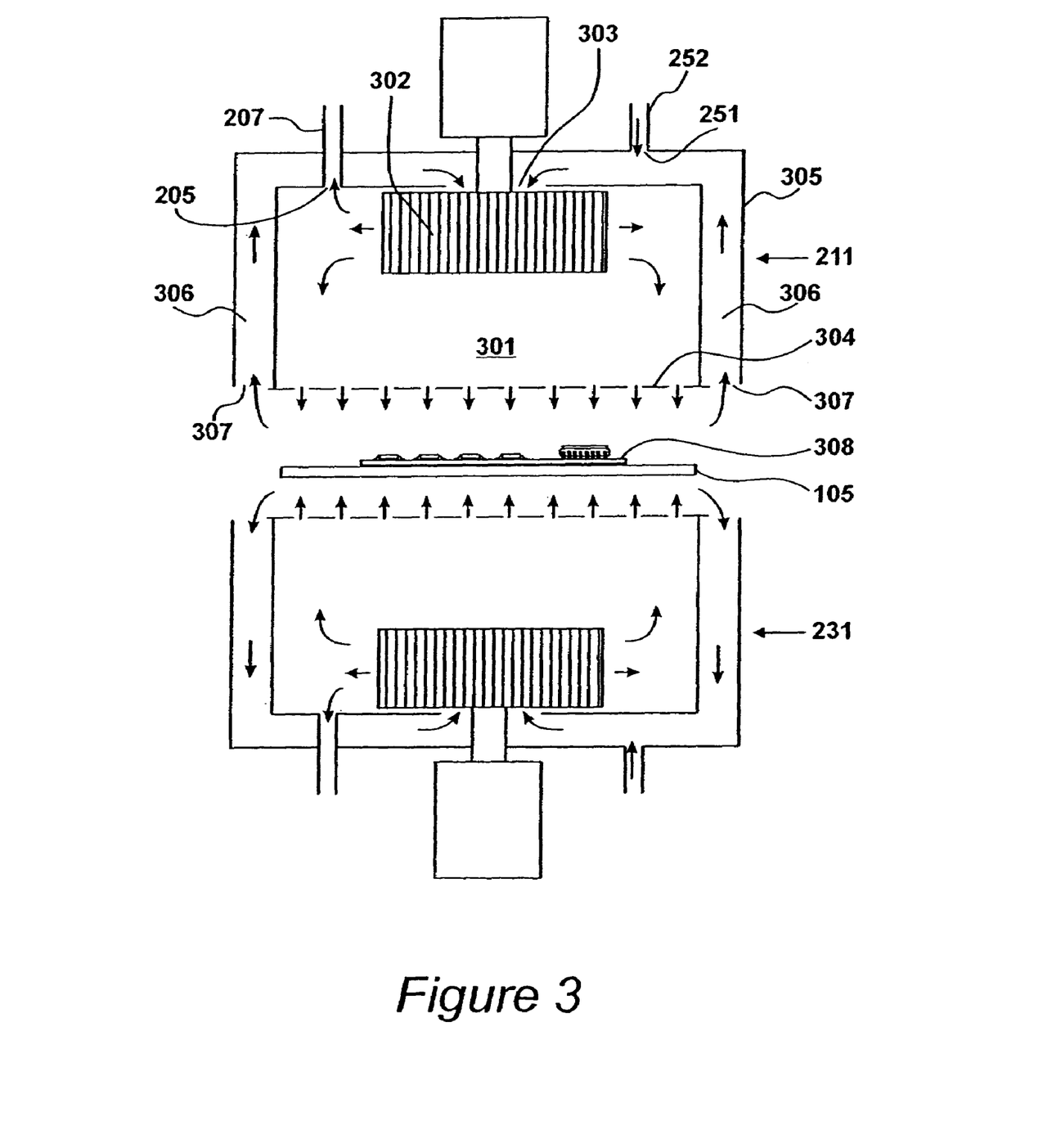
FIG. 3 shows a view along the conveyor belt 105 of the heating units 211 and 231.

FIG. 3

A view along the conveyor belt 105 of the heating units 211 and 231 is provided in FIG. 3. The heating units such as 211 and 231 comprise of a plenum chamber 301 containing a centrifugal fan 302 located adjacent to an inlet 303, such that in operation the fan 302 draws air into the plenum chamber 301. The plenum chamber 301 has an electrically heated perforated wall 304 which forms the ceiling of the tunnel in the case of upper units such as 211, and forms the floor of the tunnel in the case of the lower units such as 231. The plenum chamber 301 is located within an outer case 305 such that a passageway 306 is formed between the side and upper walls of the plenum and the corresponding walls of the case. The passageway has openings 307 adjacent to the perforated wall 304 and it is also in communication with plenum 301 via plenum inlet 303.

The outlet 205 of the heating unit 211 provides communication between the plenum chamber and the outlet branch pipe 207, and similarly inlet 250 provides communication between passageway 306 and inlet branch pipe 251.

During operation the high pressure within the plenum 301, caused by fan 302, forces air through the perforations in the heated wall 304. Thus, heated nitrogen gas is blown onto the conveyor belt 105 and, of course, onto any printed circuit boards, such as printed circuit board 308, presently being transported by the conveyor in the corresponding region of the tunnel. The gas is then drawn through opening 307 and passageway 306 by the fan 302, and then back into the plenum 301. When the corresponding solenoid valves are open, gas will also be forced out of plenum 301 into outlet branch pipe 207, to be filtered, while a flow of filtered gas is drawn into passageway 306 from inlet branch pipe 252. It may be noted that the pressure differentials produced by the fan 302 assist the circulation of gas to and from filtering unit 103.

In an alternative embodiment, contaminated gas is drawn from the passageway 306 for filtering and the filtered gas is then returned to the plenum 301. This system operates against the pressure differential produced by the centrifugal fan 302. However, it has the advantage that the gas in the passageway which is relatively dirty is drawn away for filtering, whereas the plenum chamber gas is relatively clean, since it partly comprises of the newly received filtered gas and the fresh nitrogen.

Figure 4:
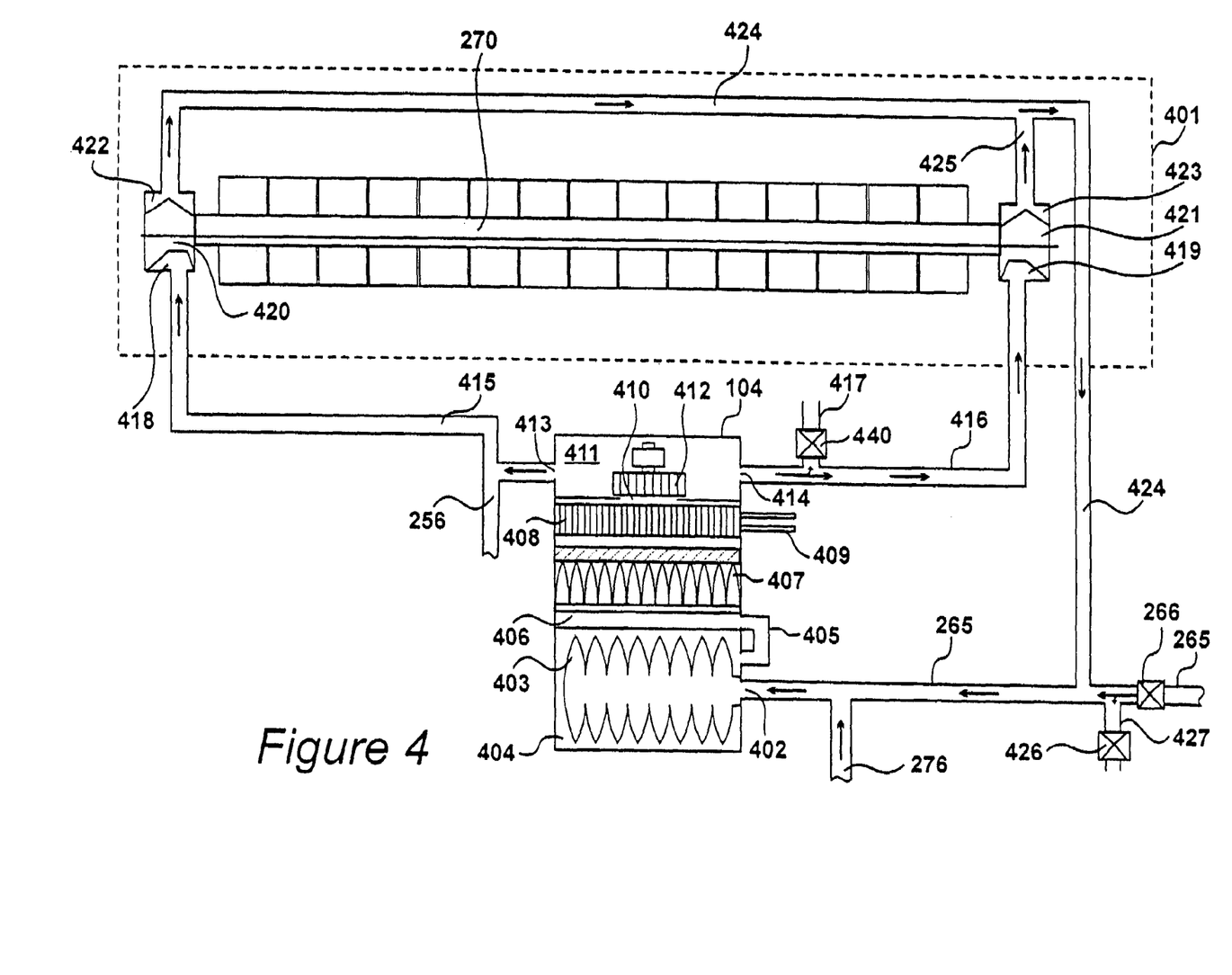
FIG. 4 shows schematically, selected components within the reflow oven 102, along with the second filtering unit 104.

FIG. 4

Selected components within the reflow oven 102 are shown schematically within dashed line 401 in FIG. 4, along with the second filtering unit 104. The gas removal pipe 265 provides communication between the balancing valve 266 and the inlet 402 of a filter-bag 403 located within a first chamber 404 of the filtering unit 104. The filter-bag 403 is of substantially the same type as filter-bag 261. A connecting pipe 405 connects the first chamber 404 with the lower part of a second chamber 406 containing a HEPA (high efficiency particle arrestor) and chemical filter 407, and a heat exchanger 408. The standard of filtration of filtering unit 104 is therefore sufficiently high so as to produce gas which may be released into the workspace. The heat exchanger 408 is cooled by chilled water received from, and returned to, a reservoir (not shown) via pipes 409. The second chamber 406 has an outlet 410 connecting it with a third chamber 411. The chamber 411 contains a centrifugal fan 412 located adjacent to the outlet 410, such that it draws gas through outlet 410 from chamber 406 and into chamber 411.

The third chamber 411 of filtering unit 104 has outlets 413 and 414 connecting it with gas jet supply pipes 415 and 416 respectively. The pipe 256 which supplies cooled gas to the heat exchanger 255 of filtering unit 103 branches from gas jet supply pipe 415. The gas is returned to the filtering unit 104 from the heat exchanger 255 via pipe 276 connected to gas removal pipe 265.

A system outlet pipe 417 branches from gas jet supply pipe 416 allowing gas to be released from the system 101 via room air bleed valve 440.

The gas jet supply pipes 415 and 416 connect with one of two gas jets 418 and 419 respectively. Each of the gas jets 418 and 419 form part of a push-pull extraction unit 420 and 421 respectively, located adjacent to each of the open ends of the tunnel. The push-pull extraction units 420 and 421 each have a gas receiving funnel 422 and 423 which is connected to gas removal pipe 265 via pipes 424 and 425.

A pipe 427 connected to gas removal pipe 265, has an in-line room air inlet valve 426 which is adjustable to allow variable rates of room air into gas removal pipe 265.

In operation, hot contaminated gas is received into filter unit 104 via balancing valve 266. As mentioned earlier, the rate of flow of said hot contaminated gas is determined by the adjustment of valve 266, but it is also variable by adjusting the speed of the centrifugal fan 412. The hot contaminated gas received from valve 266 is mixed with relatively cool gas received from pipes 424 and 276. On reaching the filter-bag 403 the mixed gases are arranged to have sufficiently low temperature to condense the flux vapours. If it is required to cool the gas further, room air is bled into pipe 265 via room air valve 426. The mixture of gases is therefore pre-filtered by filter-bag 403 before being filtered by the HEPA/chemical filter 407 and cooled by heat exchanger 408. The gas emerging from the filtering unit is sufficiently clean so as to be releasable into the workspace and because it is cool it does not raise the ambient temperature of the workspace when released via room air bleed valve 418.

However, only a portion of this cleaned cooled gas is released. As previously described, a portion of said cooled gas is used to cool heat exchanger 255 in filtering unit 103, while other portions are supplied to gas jets 418 and 419.

Gas jets 418 and 419 are configured to provide a flow of cooled gas from one side of a tunnel opening, across said opening, to the other side, towards respective funnels 422 and 423. In addition, due to the action of centrifugal fan 412, the pressure within pipes 424 and 425 is below atmospheric pressure and so the gas flow from the gas jets is drawn into the receiving funnels and then into the corresponding pipes.

In practice, a limited degree of contaminated gas escapes from the ends of the tunnel but this is entrained by the gas flow from the jets and is therefore sucked into the gas receiving funnels.

The flow of gas across the ends of the funnels tends to draw gas from within the tunnel by the Venturi effect. However, this is small compared to the effect of conventional exhaust systems which only suck away the escaping contaminated gas. Because the present arrangement draws less gas from the ends of the tunnel when compared to conventional systems, less fresh nitrogen needs to be input to the system in replacement.

It will now be understood that the gas emerging from pipe 424 and entering pipe 265 is contaminated to a degree and is also warm being a mixture of cooled gas and oven gas. Within pipe 265, it is mixed with gas from other sources as previously described such that the temperature of the final mixture entering filtering unit 104 is sufficiently low to allow efficient filtering by pre-filter 403.

Figure 5:
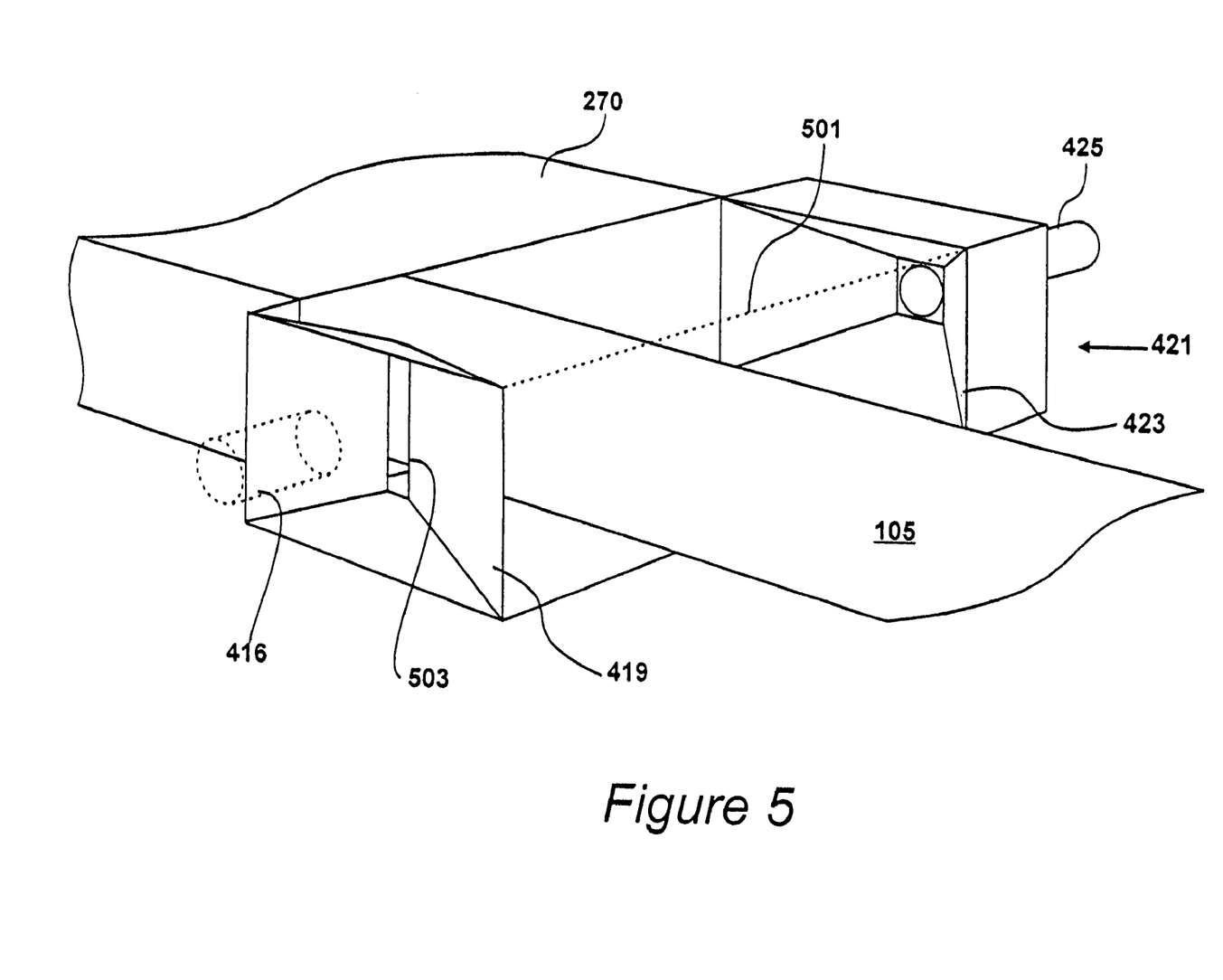
FIG. 5 shows a perspective view of a push-pull extraction unit 421.
Figure 6:
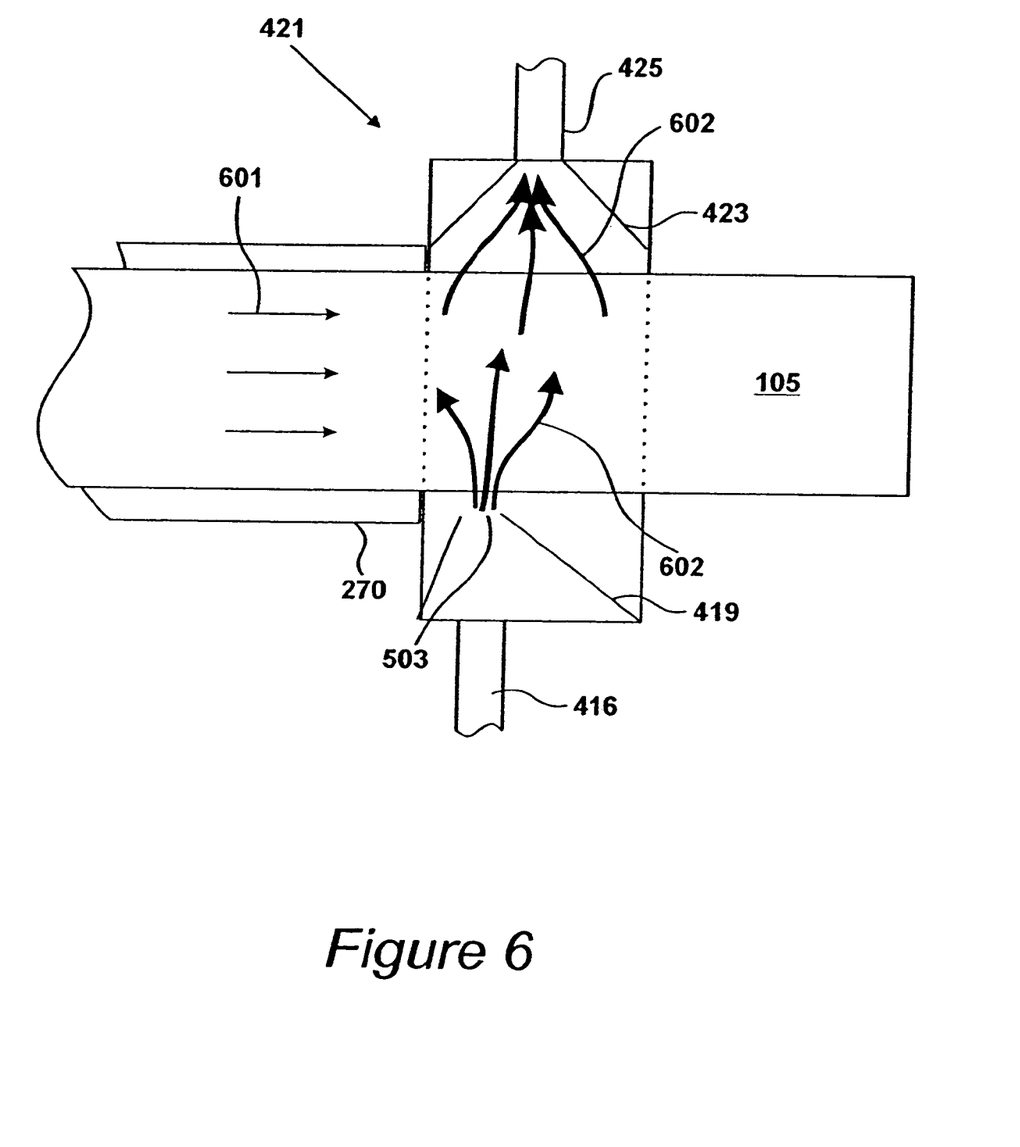
FIG. 6 shows a plan view of the push-pull extraction unit 421.

FIGS. 5 and 6

Push-pull extraction unit 421 is illustrated in the perspective view of FIG. 5, and the plan view of FIG. 6. The extraction unit is manufactured from stainless steel sheet. However, gas jet supply pipe 416, an outside panel to which said pipe is connected, and a top panel having an edge 501 are shown in FIG. 5 as being transparent, in order to show the structure of the extraction unit 421 more clearly.

The push-pull extraction unit 421 is positioned at the end of the tunnel 270 around conveyor belt 105. As described above, the gas jet 419 is located at one side of the end of the tunnel 270 and the gas receiving funnel 423 is located at the opposite side.

The gas jet 419 is configured to have a compartment which receives gas from pipe 416 and allows gas to exit via a rectangular aperture 503. The receiving funnel 423 has a wide open end adjacent to the conveyor belt and a narrower end from which extends pipe 425.

The small volume of contaminated gas which escapes from the end of the tunnel is indicated by arrows 601 in FIG. 6, while the flow of gas from gas jet 419 to funnel 423 is indicated by arrows 602.

Figure 7:
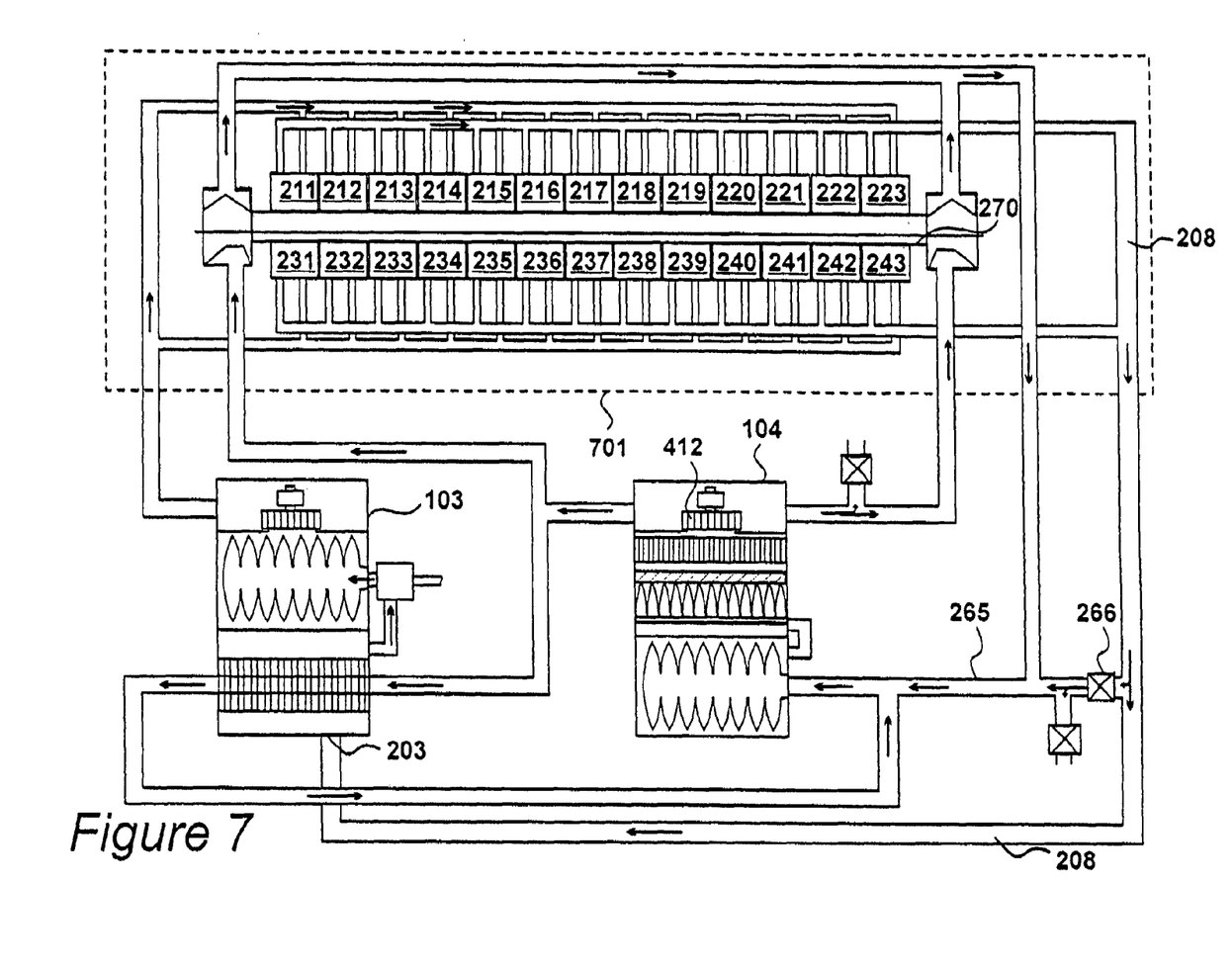
FIG. 7 shows schematically, selected components of the oven 102, along with the filtering units 103 and 104.

FIG. 7

Selected components of the oven 102 are shown schematically within a dashed line 701 in FIG. 7 along with the filtering units 103 and 104. The features of FIG. 7 are identified by the same numbers as used in the preceding Figures. Therefore, included within the oven are heating units 211 to 223 and 231 to 243, and main pipe 208 is used to transport contaminated gas from the heating units to the inlet of first filtering unit 103, while gas removal pipe 265 connects pipe 208 with the inlet of filtering unit 104, via balancing valve 266.

If, during operation, balancing valve 266 were closed, the mass of gas within the oven and filtering unit 103 would increase due to the fresh nitrogen input at the Coanda gas mixer 259. This would result in gas being forced to escape from the ends of the tunnel, and consequently contaminated gas from hotter regions of the tunnel would have to pass through the cooler regions at either end of the tunnel. This would result in condensation on the cooler surfaces within the tunnel and produce the previously discussed problems. This unwanted gas flow is also exacerbated by the expansion of the fresh nitrogen gas as its temperature increases. Furthermore, as flux volatilizes in the tunnel, this also causes increased volume of gas in the tunnel, tending to force excess gas along the tunnel and out through its ends.

In order to avoid the unwanted gas flow along the tunnel, balancing valve 266 is opened to allow a proportion of the gas in main pipe 208 to be drawn into filtering unit 104 via gas removal pipe 265. By allowing gas through valve 266 at the required rate the gas flow from the ends of the tunnel is minimized. It should be noted that a zero rate of flow from the ends of the tunnel would be ideal, but a flow into the ends of the tunnel is undesirable since the atmosphere in the tunnel would then become contaminated with atmospheric oxygen. Therefore, in practice, the gas flow from the ends of the tunnel is kept to a positive minimal value by adjusting the valve 266 and/or the speed of centrifugal fan 412, in dependence of measurements of said gas flow. The condensation of flux vapors on cool surfaces of the oven is therefore not totally eliminated but is greatly reduced such that it does not cause problems before a scheduled shut down of the oven for cleaning procedures.

Figure 8:
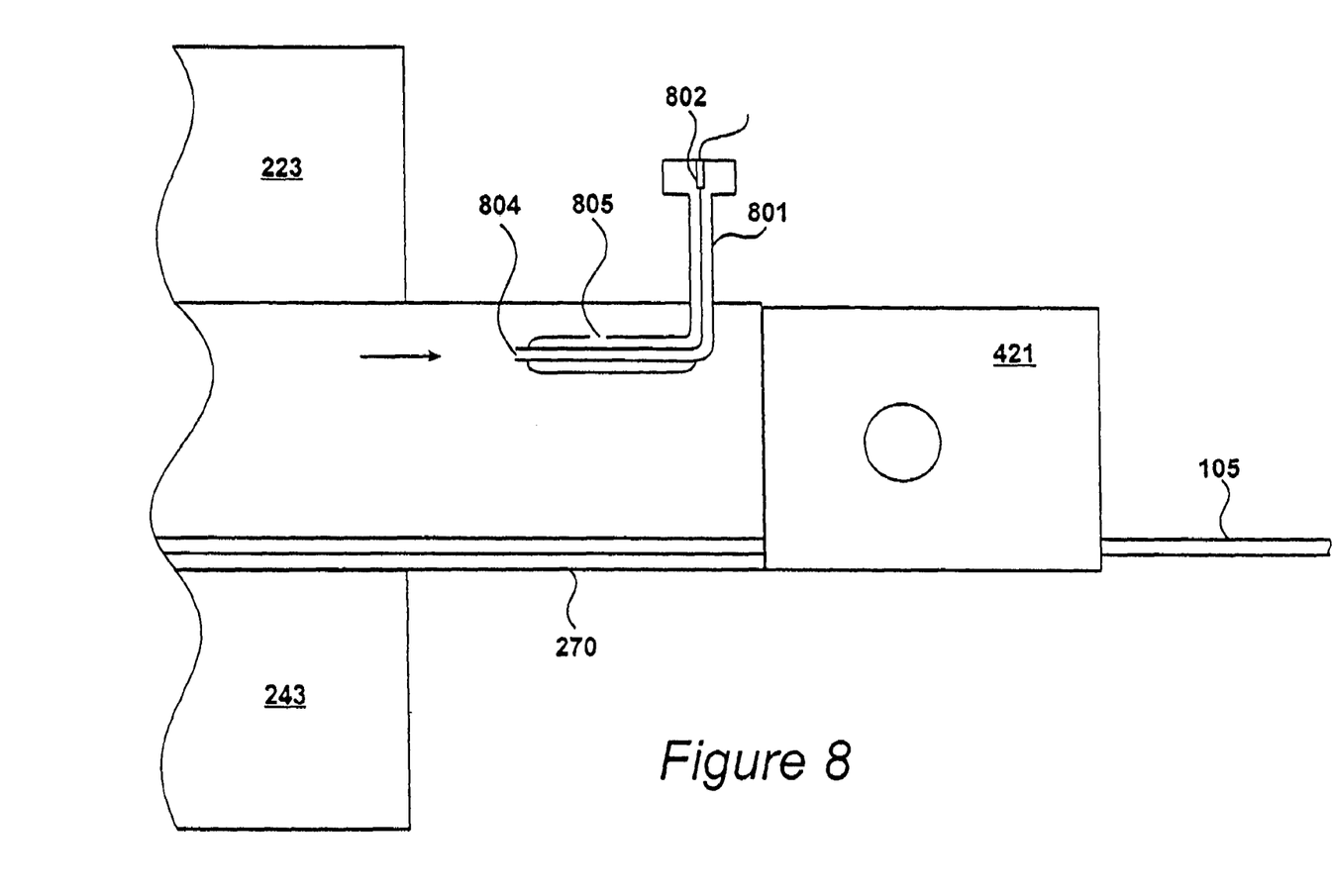
FIG. 8 shows a device 801 for measuring gas flow at the ends of the tunnel 270.

FIG. 8

A device 801 for measuring gas flow at the ends of the tunnel 270 is shown in FIG. 8. The device 801 is a Pitot tube which provides an electrical output from a pressure transducer 802 in dependence of the pressure appearing at aperture 804 perpendicular to the gas flow, and aperture 805 which is parallel to the gas flow. As is known, the electrical output thus provides a value from which the velocity of the gas flow is determined.

As shown in FIG. 8, the device 801 is located just inside the end of the tunnel towards its ceiling, where gas flow tends to be largest. It is also located between the final heating units 223,243 in the series and the push-pull extraction unit 421, so as not to be affected by local gas flows caused by said units.

The balancing valve 266 and/or the speed of the fan 412 is therefore adjusted in response to the value of the electrical output from the device 801. This is done automatically by the filtering unit 104 which is controlled by a microcontroller (not shown).

Figure 9:
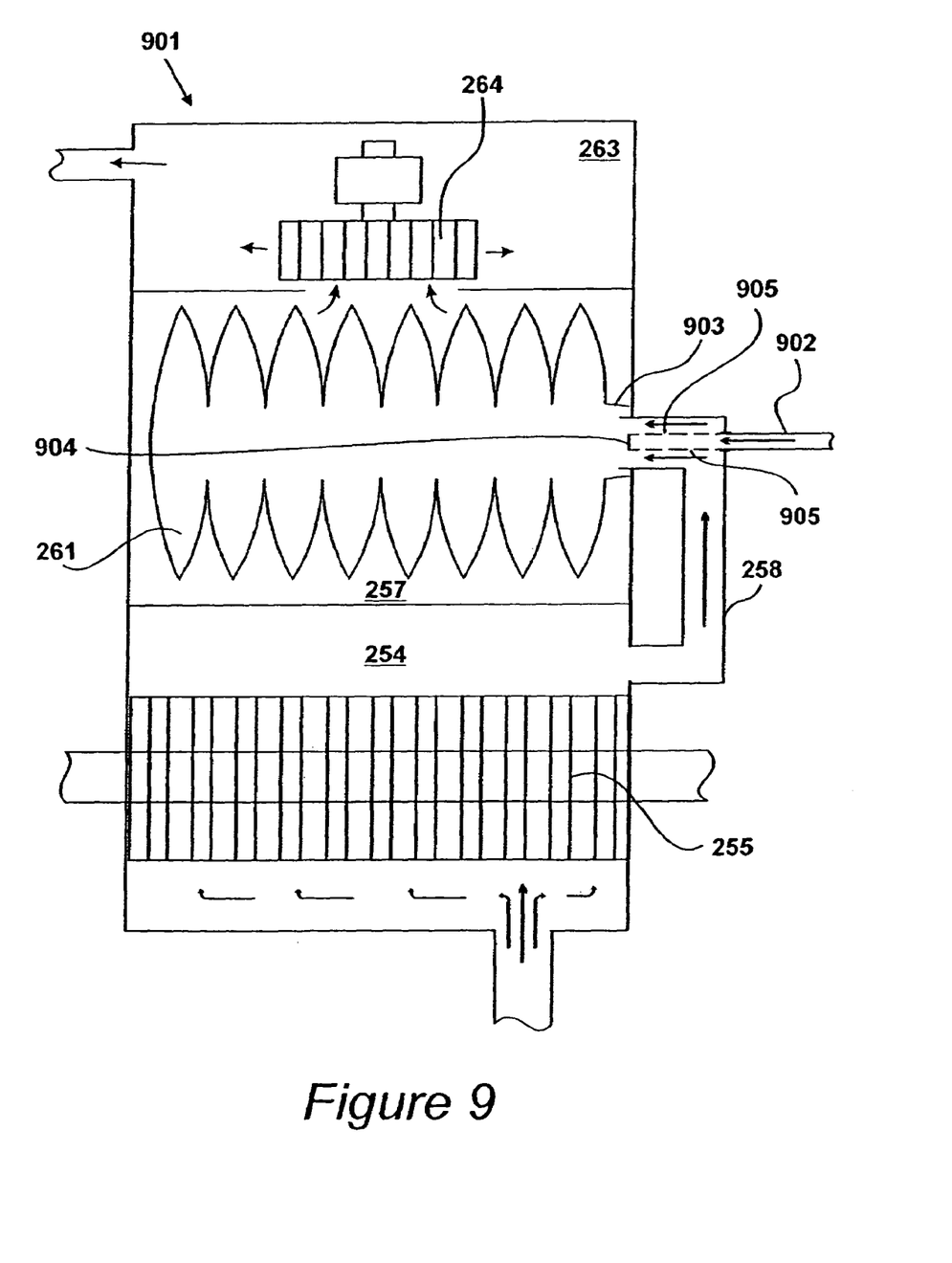
FIG. 9 shows an alternative filtering unit 901 of an alternative system.

FIG. 9

An alternative filtering unit 901 of an alternative system is shown in FIG. 9. The alternative system is the same as the system 101 except that the first filtering unit 103 is replaced by the alternative filtering unit 901. The alternative filtering unit 901 is alike to filtering unit 103 and therefore it has a first chamber 254 containing a heat exchanger 255, a connecting pipe 258 from the first chamber to a second chamber 257, a filter-bag 261 within the second chamber and a third chamber 263 containing a centrifugal fan 264. However, the pipe 258 is not connected to a Coanda gas mixer. Instead, a pipe 902 carrying fresh nitrogen gas from a cylinder, is arranged to extend through part of pipe 258, adjacent to the inlet 903 of the filter bag 261. The pipe 902 is blanked off at its end nearest to the filter-bag, but the portion of pipe within the pipe 258 has a series of circular apertures 905 equally spaced along its length and around its circumference.

In operation the relatively cool nitrogen escapes from apertures 905 and mixes with the contaminated gas passing through pipe 258, thereby cooling the contaminated gas before it is filtered by the filter-bag. The pipe 902 therefore provides an alternative means of mixing fresh process gas with contaminated gas.

In the described embodiments pipes are used as the channelling means for transporting gases around the system. However, in alternative embodiments, some of said pipes are replaced by ducting.

The invention claimed is:

1. A system for reflow soldering comprising:
   a reflow oven having an inlet and an outlet and a plurality of regions, the regions producing flux vapor at various rates, at least one region comprising a pre-heat region, at least another region comprising a high-temperature region at or above a solder reflow temperature;
   a contaminated-gas inlet configured to receive contaminated gas from at least one of the plurality of regions of the reflow oven;
   a filter assembly configured to filter contaminated gas received from the reflow oven through the contaminated-gas inlet;
   a cleaned-gas outlet configured to receive cleaned gas from the filter assembly and to introduce cleaned gas into at least one of the plurality of regions of the reflow oven; and
   a gas barrier on a flow path separate from the cleaned-gas outlet, the gas barrier comprising a unit located at the inlet and the outlet of the oven configured to receive cleaned gas from the filter assembly and to move cleaned gas past the inlet and the outlet of the oven, thereby preventing a flow of ambient atmosphere into the oven through the inlet and the outlet of the oven.

2. The system of claim 1, wherein the gas barrier unit is configured to pull cleaned gas past the inlet and the outlet of the oven.

3. The system of claim 1, wherein the gas barrier unit is configured to push cleaned gas past the inlet and the outlet of the oven.

4. The system of claim 1, wherein the gas barrier unit is configured to push and pull cleaned gas past the inlet and the outlet of the oven.

5. The system of claim 1, wherein the gas barrier unit further comprises an extraction unit configured to move cleaned gas across openings of the inlet and the outlet of the oven, thereby deflecting gas escaping from the openings.

6. The system of claim 1, wherein the gas barrier unit further comprises an extraction unit configured to move cleaned gas transversely across openings of the inlet and the outlet of the oven, thereby deflecting gas escaping from the openings.

7. The system of claim 1, wherein the gas barrier unit further comprises an extraction unit comprising a gas pushing device configured to blow the cleaned gas across the openings, a gas inlet disposed to receive a mixture of the cleaned gas from the blowing device and gas escaping from the openings.

8. The system of claim 1, wherein the gas barrier unit further comprises an extraction unit comprising a gas pushing device configured to blow the cleaned gas transversely across the openings, a gas inlet opposite the blowing device for receiving a mixture of the cleaned gas and gas escaping from the openings.

9. The system of claim 1, further comprising a flow path from the gas barrier unit disposed to return the cleaned gas to the filter assembly.

10. The system of claim 1, further comprising a flow path from the gas barrier unit, and an outlet from the flow path configured to exhaust the cleaned gas out of the system.

11. The system of claim 1, further comprising a flow path from the gas barrier unit to the filter assembly to return gas to the filter assembly.

12. The system of claim 1, wherein the filter assembly comprises:
   a filtering device on a first circulation path from the contaminated-gas inlet;
   a returned gas outlet for returning filtered gas on the first circulation path to the reflow oven; and
   a gas removal arrangement on a branch path off the first circulation path configured to allow gas from the contaminated gas inlet to escape from the system.

13. The system of claim 12, wherein the gas barrier is located on a branch flow path from the gas removal arrangement.

14. The system of claim 12, further comprising a flow control arrangement operative to balance gas flow between the filtering device and the gas removal arrangement and control the rate of gas flow through the gas removal arrangement in dependence on a flaw rate of gas within the reflow oven, whereby the flow rate of contaminated gas flowing from a hotter region of the reflow oven to a cooler region of the reflow oven is controlled.

15. The system of claim 14, wherein the flow control arrangement includes a measuring device configured to provide an indication of the flow rate of contaminated gas flowing from the hotter region of the reflow oven to the cooler region, such that flow to the filtering device and to the gas removal arrangement is adjustable in response to the indication of the flow rate.

16. The system of claim 1, further comprising a flow control arrangement operative to balance gas flow between the cleaned-gas outlet and the gas barrier, whereby the flow rate of contaminated gas flowing from a hotter region of the reflow oven to a cooler region of the reflow oven is controlled.

17. The system of claim 1, further comprising a fresh process gas inlet downstream of the contaminated-gas inlet configured to introduce fresh process gas into the system.

18. The system of claim 1, wherein the filter assembly further includes:
   a filtering device operative to filter the contaminated gas to produce cleaned gas, such that the cleaned gas can be exhausted into a user occupied space;
   a cooling device for cooling the cleaned gas to produce cooled gas; and
   an outlet configured to exhaust the cooled gas.

19. The system of claim 1, wherein the contaminated-gas inlet is configured to receive contaminated gas from at least two of the plurality of regions of the reflow oven.

20. The system of claim 1, wherein the cleaned-gas outlet is configured to introduce cleaned gas into at least two of the plurality of regions of the reflow oven.

21. The system of claim 1, wherein the reflow oven includes a plurality of heating units, the heating units connected to the contaminated-gas inlet by a plurality of valves.

22. The system of claim 1, wherein the reflow oven includes a plurality of heating units, the heating units connected to the cleaned-gas outlet by a plurality of valves.

23. The system of claim 1, wherein the reflow oven includes a plurality of heating units, the heating units arranged in upper and lower pairs, upper ones of the heating units defining an upper surface of a tunnel through the reflow oven, lower ones of the heating units defining a lower surface of the tunnel through the reflow oven.

24. The system of claim 1, wherein the reflow oven includes a plurality of heating units, the heating units arranged in pairs of an upper unit and a lower unit, each pair connected to the contaminated gas inlet by a valve controllable to control flow through the valve.

25. The system of claim 1, wherein the reflow oven includes a plurality of heating units, the heating units arranged in pairs of an upper unit and a lower unit, each pair connected to the cleaned-gas outlet by a valve, the valves individually controllable to control flow therethrough.

26. The system of claim 1, wherein the reflow even includes a plurality of heating units, the heating units arranged in pairs of an upper unit and a lower unit, each pair connected to the contaminated-gas outlet by a valve and to the cleaned-gas outlet by a further valve, the valves individually controllable to control flow therethrough.

* * * * *

UNITED STATES PATENT AND TRADEMARK OFFICE
CERTIFICATE OF CORRECTION

| | | |
|---|---|---|
| PATENT NO. | : 7,014,673 B2 | |
| APPLICATION NO. | : 10/971660 | |
| DATED | : March 21, 2006 | |
| INVENTOR(S) | : Philip Arthur Mullins | |

It is certified that error appears in the above-identified patent and that said Letters Patent is hereby corrected as shown below:

Title Page, Foreign Application Priority Data (30), "01 13 043" should read --01 13 043.4--;

Column 10, claim 14, line 50, "flaw" should read --flow--; and

Column 12, claim 26, line 17, "even" should read --oven--.

Signed and Sealed this

Thirtieth Day of January, 2007

JON W. DUDAS
*Director of the United States Patent and Trademark Office*